United States Patent
Liu et al.

(10) Patent No.: US 8,532,856 B2
(45) Date of Patent: Sep. 10, 2013

(54) TEMPERATURE-BASED STATE OPTIMIZATION OF A HYBRID TRANSMISSION

(75) Inventors: Jinming Liu, Saginaw, MI (US); Lan Wang, Troy, MI (US); Shannon E. Reeves, Milford, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/290,488

(22) Filed: Nov. 7, 2011

(65) Prior Publication Data

US 2013/0116869 A1    May 9, 2013

(51) Int. Cl.
| | |
|---|---|
| *B60L 9/00* | (2006.01) |
| *B60L 11/00* | (2006.01) |
| *G05D 1/00* | (2006.01) |
| *G06F 7/00* | (2006.01) |
| *G06F 17/00* | (2006.01) |

(52) U.S. Cl.
USPC .............................................. 701/22; 701/56

(58) Field of Classification Search
USPC .................... 701/22, 51, 55, 56, 58
See application file for complete search history.

(56) References Cited

U.S. PATENT DOCUMENTS

| | | | | |
|---|---|---|---|---|
| 6,558,293 | B2 * | 5/2003 | Skupinski et al. | 477/97 |
| 7,988,591 | B2 | 8/2011 | Heap | |
| 2009/0111651 | A1 * | 4/2009 | Gale et al. | 477/98 |
| 2011/0301795 | A1 * | 12/2011 | Failing | 701/22 |

* cited by examiner

*Primary Examiner* — Mary Cheung
*Assistant Examiner* — Frederick Brushaber
(74) *Attorney, Agent, or Firm* — Quinn Law Group, PLLC

(57) ABSTRACT

A hybrid electric vehicle has a controller, an engine, a traction motor, and a transmission. The controller is configured for calculating, using a costing function, the total system losses incurred at each operating point of the HEV, including the losses for each of the engine, the traction motor, and the transmission. The controller selectively modifies the calculated cost of at least one of the engine, the traction motor, and the transmission in a designated one of the transmission states as a function of transmission fluid temperature. An optimal transmission state is then selected as the state having the optimal cost relative to the other transmission states. Selectively modifying the calculated cost may include penalizing the cost of using designated transmission states when the measured fluid temperature exceeds certain calibrated temperature limits. Designated operating states may be disabled above an upper temperature limit to protect the transmission from overheating.

12 Claims, 1 Drawing Sheet

TEMPERATURE-BASED STATE OPTIMIZATION OF A HYBRID TRANSMISSION

TECHNICAL FIELD

The present disclosure relates to the selection of an optimal transmission operating state in a hybrid electric transmission.

BACKGROUND

Hybrid electric vehicles (HEVs) can be selectively powered in an electric-only/electric vehicle (EV) propulsion mode using one or more electric traction motors. The traction motors can also assist an internal combustion engine in delivering torque to a set of drive wheels. Each traction motor is selectively energized by a high-voltage energy storage system (ESS). In return, the ESS may be recharged during vehicle operation by capturing braking energy during a regenerative braking event. The ESS may also be recharged when the vehicle is not running, for instance by plugging the ESS into a wall outlet or charging station.

An HEV typically runs in EV mode up to a threshold speed before transitioning to engine power. A power transmission transfers engine and motor torque to a transmission output member in a combination that is determined by the controller as a function of requested input torque. The transmission may contain various fluid-actuated clutches which selectively connect and disconnect members of one or more gear sets to thereby select between various transmission states, e.g., fixed gear modes, electrically variable or continuously variable transmission modes, and one or more EV modes.

SUMMARY

A method and system are disclosed herein for selecting between different transmission operating states in a hybrid electric vehicle (HEV) in a manner that protects the transmission from overheating, particularly under especially heavy loads or in hot weather. A transmission controller executes a state optimization function which determines the optimal/minimal loss operating point for the HEV. As will be understood by those of ordinary skill in the art, hybrid state optimization typically includes calculating, for each speed-based operating point of the HEV, the total system losses associated with certain powertrain components. For instance, the controller may calculate the total spin losses occurring in the transmission. The controller then selects an optimal operating point which corresponds to a powertrain mix that provides the lowest total system losses for a given requested torque.

The present approach selectively manipulates this calculated total system loss value as a function of transmission fluid temperature (TFT). The controller progressively weights and thus penalizes the cost of using certain designated transmission operating states as the measured TFT increases above a lower temperature limit. Above an upper temperature limit, the controller may temporary disable the designated state(s).

A calibrated TFT band may be recorded in tangible, non-transitory memory of an onboard transmission controller. The calibrated TFT band is bounded by a lower temperature limit (T1) and an upper temperature limit (T2). The TFT is measured during vehicle operation, for instance using a thermistor or other suitable fluid temperature sensor positioned in the transmission and/or in a main fluid sump. The temperature sensor transmits the measured TFT to the controller. The controller then executes a control action in a manner which depends on how the measured TFT compares to the limits of the calibrated TFT band.

The controller may execute a first control action with respect to the transmission when the measured TFT falls within the calibrated TFT band, i.e., when T1<TFT<T2. As the measured TFT rises above the lower temperature limit (T1) and approaches the upper temperature limit (T2), the controller may progressively penalize designated transmission operating states, for instance by progressively weighting a costing function associated with operating the engine, the motor(s), and/or the transmission in the designated state(s). The controller executes a second control action with respect to the transmission when the measured TFT exceeds the upper temperature limit (T2), such as temporarily disabling one or more designated transmission states until the measured TFT again drops below the upper temperature limit (T2).

The above features and advantages and other features and advantages of the present invention are readily apparent from the following detailed description of the best modes for carrying out the invention when taken in connection with the accompanying drawings.

DETAILED DESCRIPTION

Figure 1:
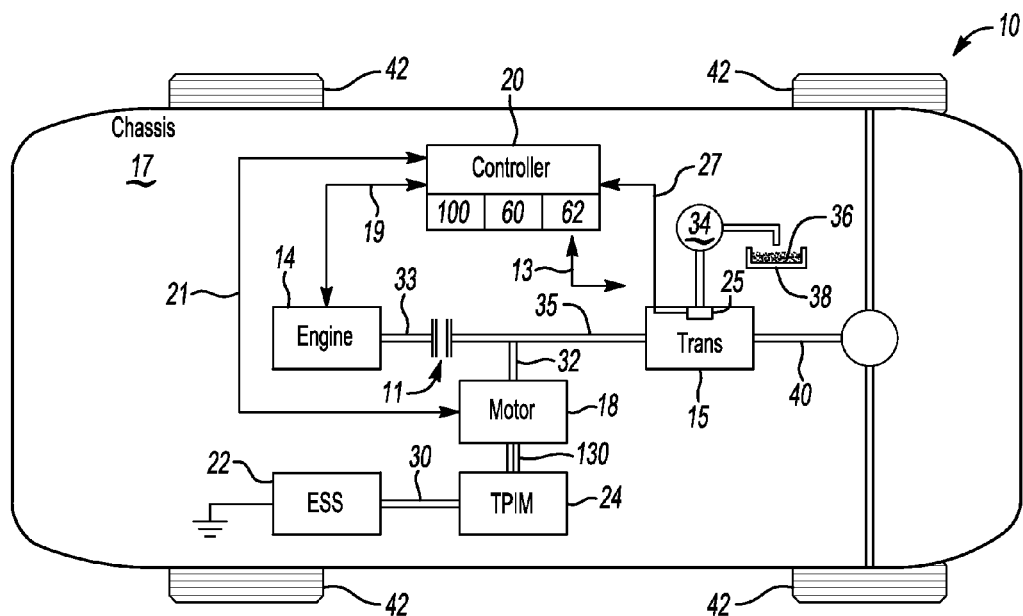
FIG. 1 is a schematic illustration of a vehicle having a hybrid electric transmission and a controller configured for optimizing state selection in the transmission as a function of temperature.

Referring to FIG. 1, a hybrid electric vehicle 10 is shown which includes an internal combustion engine 14, an electric traction motor 18, a transmission 15, and a transmission controller 20, all of which are positioned with respect to a chassis 17. The controller 20 includes tangible, non-transitory memory 60 on which is recorded process instructions or computer-executable code embodying the present method 100. Execution of the method 100 by a processor 62 helps prevent the overheating of the transmission 15 during certain transmission operating states, particularly during heavy operating loads and/or during hot weather conditions. The controller 20, in executing method 100, selects a hybrid mode/state, thus determining the particular mix and speeds of the engine 14 and the traction motor 18. This is performed as a function of a measured transmission fluid temperature (TFT), which is represented in FIG. 1 by arrow 27. An example of the present method 100 is provided below with reference to FIG. 3.

In the example vehicle 10 of FIG. 1, the engine 14 is selectively connected to the transmission 15 via an input clutch 11. The input clutch 11 may include a spring and damper assembly (not shown) suitable for damping the connection between a crankshaft 33 of the engine 14 and an input shaft 35 of the transmission 15. The transmission 15 also has an output shaft 40 which delivers torque from the transmission 15 to a set of drive wheels 42. The transmission 15 may be configured as an electrically-variable transmission (EVT) or any other suitable transmission capable of transmitting torque to the drive wheels 42.

The traction motor 18 may be configured as a relatively high-voltage multi-phase electric machine, e.g., approximately 60 VAC to 300 VAC in a non-limiting example embodiment. The traction motor 18 selectively delivers motor torque to the transmission 15 via a rotor shaft 32 as needed to power the vehicle 10 in an electric-only/electric vehicle (EV) propulsion mode, or to assist the engine 14 in starting and/or in propelling the vehicle 10.

While only one traction motor 18 is shown in FIG. 1 for illustrative simplicity, additional traction motors 18 may be used without departing from the intended scope of the disclosed method 100. For instance, two traction motors 18 may be used. Each traction motor 18 is electrically connected to an energy storage system (ESS) 22 via a high-voltage DC bus 30, a traction power inverter module (TPIM) 24, and a high-voltage AC bus 130. A DC-DC converter (not shown) may also be used to regulate the voltage and supply an auxiliary power system aboard the vehicle 10.

The controller 20 of FIG. 1 includes the requisite hardware and software needed to selectively modify state selection functionality for control of the transmission 15 as a function of the measured TFT (arrow 27), i.e., the measured temperature of a supply of transmission fluid 36. Fluid 36 is circulated to the transmission 15 from a sump 38 by a fluid pump 34. The fluid pump 34 may be engine-driven or driven by auxiliary power.

The controller 20 may be a unitary control device or a distributed/networked control device. In either embodiment, the controller 20 is electrically connected to or otherwise placed in electrical communication with the engine 14 via control and feedback signals (arrow 19), the transmission 15 (arrow 13), the traction motor(s) 18 (arrow 21), and a temperature sensor 25 positioned within the fluid 36, e.g., within the transmission 15 as shown or within the sump 38. The temperature sensor 25 may be configured as a thermistor or other device suitable for measuring a temperature of the fluid 36 and communicating the measured TFT (arrow 27) to the controller 20 for use in executing the present method 100.

Control of the transmission 15 of FIG. 1 may be affected by the controller 20 by transmitting and receiving a set of control signals (arrow 13) with respect to the transmission 15. Control channels for conducting the control signals (arrow 13) may include any required busses and/or transfer conductors providing a hard-wired and/or a wireless control link suitable for communicating necessary electrical control signals aboard the vehicle 10.

Figure 2:
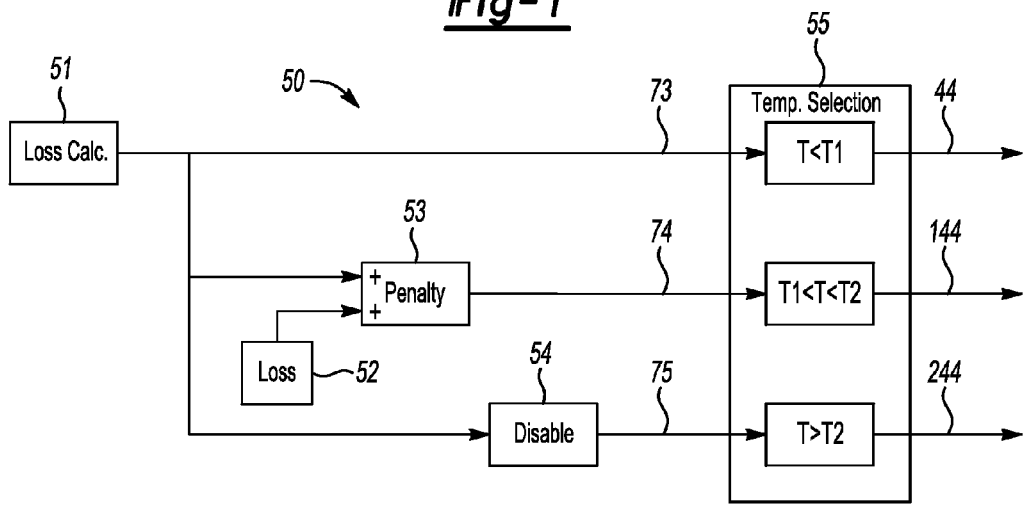
FIG. 2 is a schematic block diagram of temperature-based optimization logic usable with the controller shown in FIG. 1.

Referring to FIG. 2, the controller 20 of FIG. 1 may include control logic which may be modeled as an example block diagram 50. A loss calculation block 51 is used to calculate the total system losses for the powertrain of the vehicle 10 shown in FIG. 1. For instance, block 51 calculates total losses for each of the engine 14, the transmission 15, and the traction motor(s) 18. Block 51 is used as part of a typical optimization function which selects a lowest cost operating point. Transmission states corresponding to the operating point may include a fixed gear mode, a continuously/electrically variable transmission mode, and an EV mode, as is well understood in the art. The controller 20 executes block 51 to determine a range of permissible input torques from the engine 14 and/or traction motor(s) 18 to the transmission 15.

For each of the engine 14, the transmission 15, and the traction motor 18, a cost is assigned via block 51 for each possible operating point. As noted above, this cost is related to losses incurred by the corresponding system used for achieving that particular transmission state, for instance spin losses occurring in the transmission 15. Thus, a high value for a given cost may be imposed to penalize use of that particular system, and to ultimately affect the availability of a given transmission state. A requested torque can be provided as a mix of input torque from the engine 14 and/or the motor 18 using the output (arrow 73) of block 51.

The output (arrow 73) of block 51 is fed to a temperature selection block 55 along with two other modified outputs (arrows 74 and 75). One modified output (arrow 74) is determined by a penalty summation block 53, which applies a penalty to the costs of certain losses as determined by a loss penalty block 52. As noted below, the loss penalty block 52 may apply a weight as needed to penalize use of certain states in terms of the cost in total system losses of using those states. A disabling block 54 may be used to return modified output (arrow 75) which, rather than penalizing certain states, effectively disables those states by rendering their costs prohibitively expensive to execute in terms of cost. Block 55 then selects between the outputs 73, 74, and 75 to execute a suitable control action as a function of the measured TFT.

Figure 3:
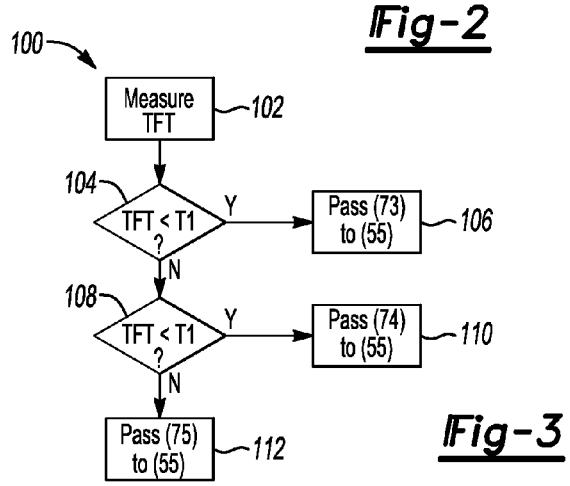
FIG. 3 is a flow chart describing a temperature-based method for optimizing transmission state selection in the vehicle shown in FIG. 1.

Referring to FIG. 3 in conjunction with FIGS. 1 and 2, an example method 100 commences at step 102 with the measurement by sensor 25 of the TFT (arrow 27 of FIG. 1). This value may be recorded in memory 60 of the controller 20.

At step 104, the controller 60 processes the measured TFT through block 55 of FIG. 2. When the measured TFT from the sensor 25 of FIG. 1 is less than the lower temperature limit (T1) of the calibrated TFT band [T1, T2], the controller 20 proceeds to step 106. Otherwise, the controller 20 proceeds to step 108.

At step 106, block 55 of FIG. 2 uses the unmodified output (arrow 73) from block 51 of FIG. 2 to generate the control portion of the control and feedback commands (arrow 44). For instance, a default control action may be executed according to the cost/loss calculations performed by block 51.

At step 108, the controller 20 may determine whether the measured TFT (arrow 27 of FIG. 1) falls within the calibrated TFT band. If the measured TFT falls within the calibrated TFT band, the controller 20 proceeds to step 110. If the measured TFT falls above the upper limit (T2) of the calibrated TFT band, the controller 20 instead proceeds to step 112.

At step 110, the controller 20 of FIG. 1 may execute a first control action by passing the modified output (arrow 74) to block 55 of FIG. 2, and thereafter penalizing to some extent the selection of one or more designated transmission states. That is, when the measured TFT is above the lower temperature limit (T1) but below the upper temperature limit (T2), the penalty block 52 of FIG. 2 penalizes/increases certain costs in the output of block 51 as part of the first control action. Block 52 thus applies a variable cost component to certain designated transmission states, e.g., specific EV, EVT, or fixed gear modes, as a function of the measured TFT and any output torque request from a driver of the vehicle 10.

This loss costing function is weighted so as to progressively penalize one or more designated states of the transmission 15 beginning at the lower temperature limit (T1). The costing function may be embodied as a weighting function, with an example weight of 1 assigned to some of the calculated losses when the measured TFT is below the lower temperature limit (T1) and a weight of 0 assigned to the same losses at or above the upper temperature limit (T2). The transition between the weight assigned for the lower temperature limit (T1) and the weight assigned for the upper temperature limit (T2) can be linear in a particular non-limiting embodiment, or non-linear in another.

The costing function of block 52 of FIG. 2 thus effectively modifies the output (arrow 73) of block 51 so as to provide the modified output (arrow 74) to block 55. The modified output (arrow 74) causes block 55 to pass commands (arrow 144) to the transmission 15 to "cost penalize" the use of one or more designated transmission states as the first control action. This helps protect the transmission 15 from overheating in the designated states. For example, an engine-specific cost component in the total cost structure of block 51 can be modified via block 52 between the lower temperature limit (T1) and the upper temperature limit (T2). Engine speed can be selected at a level that better protects the transmission 15 from overheating the designated transmission states. All states remain available between (T1) and (T2) at step 110. However, the designated states become progressively more costly to execute in terms of losses, and thus become progressively less likely to be selected as the measured TFT approaches the upper temperature limit (T2).

At step 112, when the measured TFT is determined to be above the upper temperature limit (T2), the designated state(s) may be temporarily disabled by the disabling block 54 of FIG. 2. The modified output (arrow 75) from block 54 is passed to block 55, such that the commands (arrow 244) passed to the transmission 15 ultimately disable the designated state(s) as the second control action. These states may remain disabled, i.e., unavailable for selection by the controller 20, until the measured TFT again drops below the upper temperature limit (T2). The actual designated states affected by block 52 can be expected to vary with the design.

The detailed description and the drawings are supportive and descriptive of the present invention. However, the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for selecting between transmission states in a hybrid electric vehicle (HEV) having a controller, an engine, a traction motor, and a transmission, the method comprising:
   calculating, using a loss costing function, the total system losses at each operating point of the HEV, including calculating the loss costs for each of the engine, the traction motor, and the transmission;
   measuring a temperature of a supply of transmission fluid in the HEV;
   selectively modifying the calculated loss cost for at least one of the engine, the traction motor, and the transmission in a designated one of the transmission states as a function of the measured fluid temperature; and
   selecting, via the controller, an optimal transmission state as the transmission state having an optimal cost relative to the other transmission states.

2. The method of claim 1, wherein selectively modifying the calculated cost includes temporarily disabling the availability of the designated transmission state when the measured fluid temperature exceeds a calibrated upper temperature limit.

3. The method of claim 1, wherein selectively modifying the calculated cost includes applying an equal weight to the loss costing functions of the engine, the traction motor, and the transmission when the measured fluid temperature is below a calibrated lower temperature limit.

4. The method of claim 1, wherein selectively modifying the calculated cost includes applying a different weight to the loss costing functions of at least one of the engine, the traction motor, and the transmission when the measured fluid temperature is above a calibrated lower temperature limit.

5. The method of claim 4, including applying a weight of 1 to the cost of the engine at the lower temperature limit and reducing the weight from 1 to 0 as the measured fluid temperature increases to the upper temperature limit.

6. The method of claim 5, including linearly reducing the weight from 1 to 0 as the measured fluid temperature increases to the upper temperature limit.

7. A vehicle comprising:
   an engine;
   a traction motor;
   a transmission selectively driven by torque from at least one of the engine and the traction motor in a plurality of transmission states;
   a supply of transmission fluid;
   a temperature sensor operable for measuring a temperature of the transmission fluid; and
   a controller in communication with each of the engine, the traction motor, the transmission, and the sensor, wherein the controller includes memory on which is recorded a calibrated transmission fluid temperature (TFT) band having an upper temperature limit and a lower temperature limit, wherein the controller is configured for:
      receiving the measured fluid temperature from the sensor;
      calculating, using a loss costing function, the total system losses incurred at each operating point of the HEV, including the losses for each of the engine, the traction motor, and the transmission;
      selectively modifying the calculated cost of at least one of the engine, the traction motor, and the transmission in a designated one of the transmission states as a function of the measured fluid temperature; and
      selecting an optimal transmission state as the state having an optimal cost relative to the other transmission states.

8. The vehicle of claim 7, wherein the controller is configured to selectively modify the calculated cost by temporarily disabling use of the designated transmission state when the measured fluid temperature exceeds a calibrated upper temperature limit.

9. The vehicle of claim 7, wherein the controller is configured to apply an equal weight to the loss costing functions of the engine, the traction motor, and the transmission when the measured fluid temperature is below a calibrated lower temperature limit.

10. The vehicle of claim 7, wherein the controller is configured to apply a different weight to the loss costing functions of at least one of the engine, the traction motor, and the transmission when the measured fluid temperature is above a calibrated lower temperature limit.

11. The vehicle of claim 10, wherein the controller is configured for applying a weight of 1 to the cost of using the engine at the lower temperature limit and reducing the weight from 1 to 0 as the measured fluid temperature increases toward the upper temperature limit.

12. The vehicle of claim 11, wherein the controller is configured for linearly reducing the weight from 1 to 0 as the measured fluid temperature increases toward the upper temperature limit.

* * * * *